(12) United States Patent
Christoffers et al.

(10) Patent No.: US 6,824,054 B2
(45) Date of Patent: Nov. 30, 2004

(54) APPARATUS AND METHOD FOR SIMULTANEOUSLY READING OUT OF PASSIVE INDUCTIVE TRANSPONDERS

(75) Inventors: Niels Christoffers, Duisburg (DE); Juergen Niederholz, Kerken (DE); Dirk Hammerschmidt, Heiligenhaus (DE); Gerd Vom Boegel, Wuelfrath (DE)

(73) Assignee: Fraunhofer-Gesellschaft zur Foerderung der angewandten Forshcung e.V., Munich (DE)

( * ) Notice: Subject to any disclaimer, the term of this patent is extended or adjusted under 35 U.S.C. 154(b) by 0 days.

(21) Appl. No.: 10/451,009
(22) PCT Filed: Dec. 20, 2000
(86) PCT No.: PCT/EP00/13049
§ 371 (c)(1),
(2), (4) Date: Oct. 27, 2003
(87) PCT Pub. No.: WO02/50758
PCT Pub. Date: Jun. 27, 2002

(65) Prior Publication Data
US 2004/0065735 A1 Apr. 8, 2004

(51) Int. Cl.[7] .............................................. G06K 7/08
(52) U.S. Cl. ....................................... 235/451; 235/449
(58) Field of Search .................................. 235/449, 451

(56) References Cited

U.S. PATENT DOCUMENTS

| 4,364,043 A | * | 12/1982 | Cole et al. ............... 340/10.34 |
| 5,491,715 A | * | 2/1996 | Flaxl ......................... 375/344 |
| 5,953,642 A | | 9/1999 | Feldtkeller et al. |
| 6,111,303 A | | 8/2000 | Launay |
| 6,749,119 B2 | * | 6/2004 | Scheible et al. ............ 235/451 |

FOREIGN PATENT DOCUMENTS

EP 1061663 12/2000

* cited by examiner

*Primary Examiner*—Mark Tremblay
(74) *Attorney, Agent, or Firm*—Glenn Patent Group; Michael A. Glenn

(57) ABSTRACT

The present invention relates to a transponder reading device for reading out a plurality of inductive passive transponders having a resonant circuit. A transmitter is provided to create an alternating magnetic field having an operating frequency $f_B$, in which the number of transponders may be placed such that same are magnetically coupled to each other. A retuning means is further provided which is arranged in the alternating magnetic field and has such a frequency-dependent impedance that a voltage induced in the resonant circuits of the transponders by the alternating magnetic field has a maximum in the range of the operating frequency $f_B$.

10 Claims, 2 Drawing Sheets

APPARATUS AND METHOD FOR SIMULTANEOUSLY READING OUT OF PASSIVE INDUCTIVE TRANSPONDERS

BACKGROUND OF THE INVENTION

1. Field of the Invention

The present invention relates to apparatus and methods enabling simultaneous reading out of transponders, and in particular such methods and apparatus enabling simultaneous reading out, or reading, of passive inductive transponders arranged in a stack, so that the coils of the transponders are closely magnetically coupled to each other.

2. Description of Prior Art

With reference to FIG. 3, a conventional transponder system will be described below which consists of a base station 10 and a transponder 12, depicted schematically in FIG. 3. In the simplified representation, the base station 10 includes a power source 14, a resistor 16 serially connected to the power source, and a capacitor 18 connected in parallel to the serious connection consisting of the power source 14 and the resistor 16. Connected in parallel to the capacitor 18 is a transmitter coil 20. Along with the capacitor 18, the coil 20 thus represents a parallel resonant circuit loaded, in the simplified example, by the resistor 16 and the power source 14, and in reality by the power output stage.

The transponder 12 includes a transponder coil 22 and a tuning capacitor 24. The transponder coil 22 and the tuning capacitor 24 define a parallel resonant circuit. In addition, in the simplified schematic representation of the transponder 12, a rectifier diode 26 is connected between the parallel resonant circuit and a capacitor 28 for storing energy. A variable load, consisting of a resistor 30 and a switch 32, is arranged in parallel with the capacitor 28. Further, a transponder ASIC 34 (ASIC=application-specific integrated circuit) is provided which is connected to the switch 32 in the manner represented.

The base station 10 inductively supplies the transponder 12 with energy 36, whereas the transponder returns transponder data 38 by means of the load modulation method. Here, the transponder is a passive transponder not requiring any additional source of energy.

In the base station 10, a current in the transmitter coil 20 generates an alternating magnetic field 40 at an operating frequency $f_B$. The transponder coil 22 of the transponder 12 is arranged in the near-field region of the transmitter coil 20, so that the alternating magnetic field 40 impinges upon the transponder coil 22 and induces an electrical voltage there. The voltage induced serves the transponder ASIC 34 as an operating voltage obtained via the rectifier 26 and the capacitor 28.

To send data, the transponder ASIC 34, controlled by means of a data signal 42, switches the resistor 30 to be parallel with the capacitor 28 via the switch 32, i.e. the transponder ASIC 34 switches on the variable load. This leads to an increase in the power consumption of the transponder. Due to this power consumption of the transponder, the field generated by the transmitter coil 20 is weakened. As a consequence, the voltage applied at the resistor which exists between the transmitter coil and the power output stage and is shown schematically as a resistor 16 in FIG. 3, increases in the base station 10. These voltage changes in the base station 10 may be detected to reconstruct the data signal 42 sent by the transponder 12, such a method being referred to as load modulation.

In a transponder system as has been explained above with reference to FIG. 3, the voltage induced in the transponder coil 22 must be higher than the operating voltage of the transponder ASIC. To enable this, the tuning capacitor 24 is connected in parallel with the transponder coil 22, the tuning capacitor forming a resonant circuit with the transponder coil 22. In the transponder system shown, the resonant frequency of the transponder resonant circuit is the operating frequency $f_B$, so that the voltage induced has a local maximum at the operating frequency $f_B$ depending on the frequency.

If several transponders exist in the field of the transmitter coil of a base station, and if these transponders are closely magnetically coupled to each other, the transponders mutually influence each other. In addition to affecting the quality of the respective transponder resonant circuits, this influence also relates to the resonant frequency of the transponder resonant circuits, so that same no longer matches the operating frequency. So far it has not been possible to power and read out a stack of passive inductive transponders which are arranged, in relation to each other, such that the coils of same are closely magnetically coupled.

SUMMARY OF THE INVENTION

The present invention is based on the object of providing apparatus and methods enabling transponders arranged in a stack to be powered and read out.

In accordance with a first aspect, the present invention provides a transponder reading device for reading out a plurality of inductive passive transponders having a resonant circuit, the device comprising:

a transmitter coil for generating an alternating magnetic field having an operating frequency $f_B$, in which the plurality of transponders may be placed such that they are magnetically coupled to each other; and a retuning means arranged in the alternating magnetic field and having such a frequency-dependent impedance that a voltage induced in the resonant circuits of the transponders by the alternating magnetic field has a maximum in the range of the operating frequency $f_B$.

In accordance with a further aspect, the present invention provides a method for reading out a plurality of inductive passive transponders having a resonant circuit, the method comprising:

generating an alternating magnetic field at/with/having an operating frequency $f_B$;

placing the plurality of transponders in the alternating magnetic field such that the transponders are magnetically coupled to each other;

placing a retuning means in the alternating magnetic field, the retuning means having such a frequency-dependent impedance that a voltage induced in the resonant circuits of the transponders by the alternating magnetic field has a maximum in the range of the operating frequency $f_B$; and receiving data created by the transponders in response to the voltage induced.

The present invention is first of all based on the findings that, if several transponders are arranged in the field of the transmitter coil and if same are closely magnetically coupled to each other, the circuit elements at the terminals of each transponder coil are mapped at the terminals of every other transponder coil. This leads to an electrical network containing coupled coils. This network is no longer a simple resonant circuit. The voltage induced no longer takes on a maximum at the operating frequency and is therefore no longer high enough to power the transponder ASIC.

Instead, in a plurality of transponders arranged in close magnetic coupling to each other in the alternating magnetic field of the transmitter coil, a maximum of the voltage or the current, respectively, induced in the transponder coils is caused by each transponder coil, i.e. by each transponder oscillating circuit. These maximums occur at various frequencies, the frequency positions of all maximums changing as soon as a further transponder is added in the alternating magnetic field. If the transmitter coil is also part of an oscillating circuit, as in the example described above with reference to FIG. 3, a maximum of the voltage induced in the transponder coils is caused also by the oscillating circuit of the transmitter coil.

As has been mentioned above, the various oscillating circuits influence each other, so that, depending on the number and the nature of the transponder coils stacked, the voltage maximums have frequency positions deviating from the resonant frequencies to which the individual transponder resonant circuits are tuned. The transponders thus cannot be read out. Since the transponders have fixed device variables, for example a transponder coil inductance of 5 $\mu$H and a tuning capacitance of 2 pF, it is not possible to access the resonant frequency of the resonant circuits of the transponders. In addition, there are statutory specifications for the operating frequency $f_B$, so that same cannot be changed either, a common operating frequency for transponder systems being 13.56 MHz.

In accordance with the invention, a retuning means is therefore introduced into the near field of the transmitter coil such that the amplitudes of the voltages induced in the transponder coils, and the currents induced which are proportional to these voltages, take on a local maximum at the operating frequency $f_B$, i.e. the frequency of the transmitting voltage, and are sufficiently high to enable powering of the transponder ASIC. In accordance with the invention, the retuning means introduced into the proximity of the transponder stack and thus into the near field of the transmitter coil preferably comprises one or several coils magnetically coupling to the transponder coils. For creating a resonant circuit, a capacitor may be connected to the coil of the retuning means. Additional network elements, for example resistors or further coils, may also be connected to the coil.

Due to the retuning means introduced into the alternating magnetic field of the base station, the voltages and/or currents induced in the transponders exhibit an additional maximum, the frequency position of which may be set by a corresponding selection of the frequency-dependent impedance of the retuning means. Thus, the frequency position of this additional maximum may be set to coincide with the operating frequency $f_B$, so that all transponders may be read out at the operating frequency. By the introduction of the retuning means into the alternating magnetic field, the other maximums of the voltage or the current, respectively, induced in the transponder coil will be shifted, it being possible to shift one of these maximums to the operating frequency $f_B$. This additional maximum is used for a small number of transponders in the transponder stack, whereas a shifted maximum is used for a large number of transponders in the transponder stack.

In accordance with preferred embodiments of the present invention, the frequency-dependent impedance of the retuning means is preferably variable, provisions preferably being made for means for varying the frequency-dependent impedance until all transponders in a transponder stack respond. It is thus possible to ensure a safe readout of all transponders in a transponder stack without knowing the number of transponders in the stack.

In accordance with a further aspect, the present invention further provides a transponder means with a resonant circuit consisting of a transponder coil and a tuning capacitor, the resonant circuit being tuned such that a lower minimum cut-off frequency is in the range of a preset operating frequency $f_B$ of an alternating magnetic field, the lower minimum cut-off frequency $f_{u,min}$ being the frequency approached by the lowest-frequency maximum of the voltage induced in the transponder resonant circuit by the alternating magnetic field of the operating frequency $f_B$ if a theoretically unlimited number of transponder means are arranged in the alternating magnetic field.

In accordance with the above-mentioned third aspect, the present invention is based on the findings that the frequency, at which the absolute maximum of the voltage or the current, respectively, induced occurs, drops and approaches a lower limit, i.e. a lower minimum cut-off frequency, as the number of transponders in the transponder stack increases. If the transponder resonant circuits in such a transponder stack are dimensioned and/or tuned such this lower minimum cut-off frequency occurs at the operating frequency $f_B$, it is possible to read out the plurality of transponder means without requiring any retuning means. In a different approach, one of the plurality of transponder means may be considered the retuning means in such a case.

Further developments of the present invention are set forth in the dependent claims.

BRIEF DESCRIPTION OF THE DRAWINGS

Preferred embodiments of the present invention will be explained in more detail below with reference to the accompanying figures, in which.

DESCRIPTION OF PREFERRED EMBODIMENTS OF THE INVENTION

With reference to the schematic representations of FIGS. 1 and 2, a preferred embodiment of the present invention will be explained in more detail below.

Figure 1:
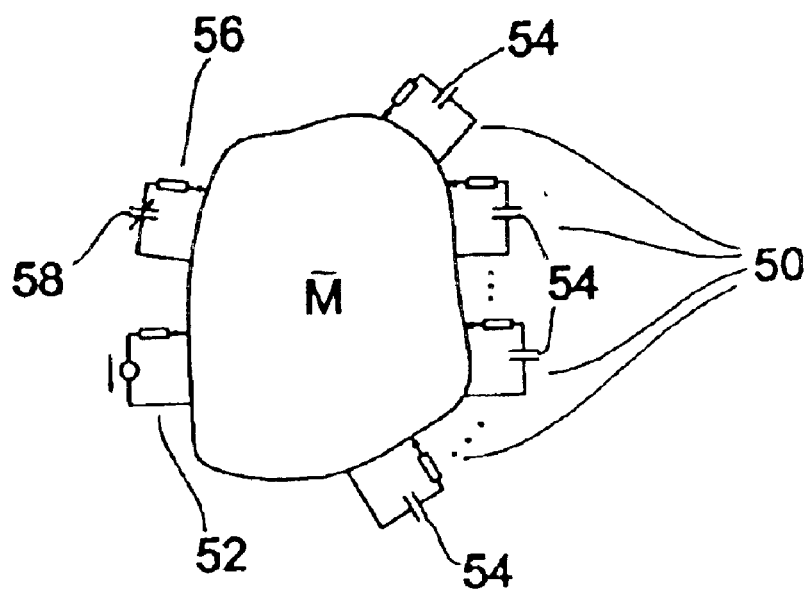
FIG. 1 shows a schematic representation for explaining the principle on which the present invention is based.
Figure 3:
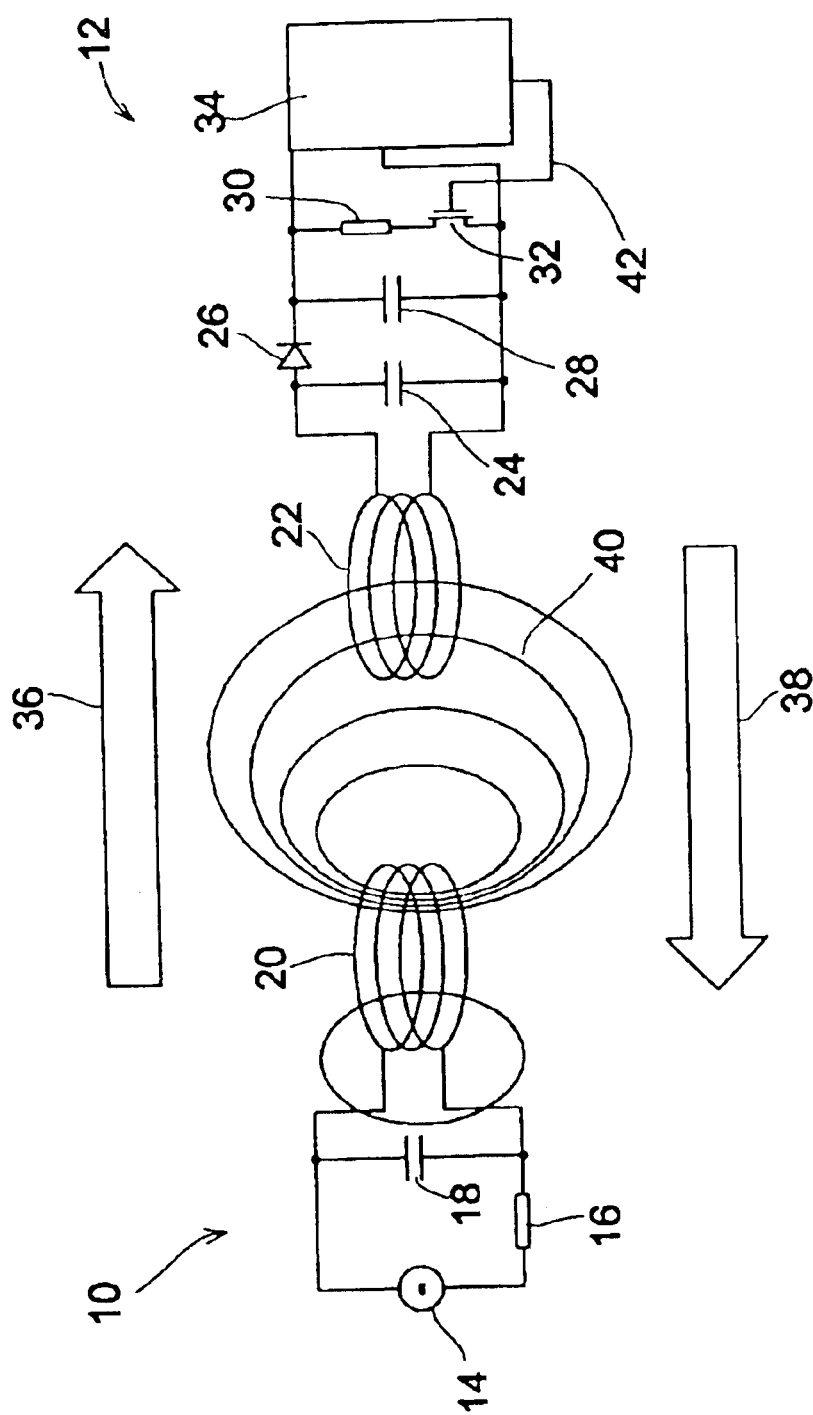
FIG. 3 shows a schematic simplified representation of a transponder system of the prior art.

FIG. 1 shows a schematic arrangement of four transponders 50 arranged in a stack such that the coils (not shown in FIG. 1) of the transponders are closely magnetically coupled to each other. FIG. 1 further shows a base station 52 which may be a transponder reading device or a transponder reading/writing means, as was explained above with reference to FIG. 3. The present invention will be described below with reference to a reading device in each case, those skilled in the art recognizing, however, that the base station may comprise an appropriate means for also enabling writing onto transponders arranged in the alternating magnetic field of same.

The transponders 50, which, for example, have the structure described above with reference to FIG. 3, are arranged in the near field of the transmitter coil (not shown in FIG. 1) of the reading device 52.

The transmitter coil of the reading device 52 creates an alternating magnetic field at an operating frequency $f_B$.

The resonant circuits of the transponders 50 are tuned to a resonant frequency via respective tuning capacitors 54. In common transponder systems serving to read out an individual transponder, the resonant frequency of the resonant circuit of the transponder is the operating frequency of the reading device. In the arrangement shown in FIG. 1, however, the resonant frequencies of the resonant circuits of the individual transponders 50 affect each other, so that same may not be read out at the operating frequency $f_B$ of the reading device.

In accordance with the present invention, a retuning means 56 is thus provided in the alternating magnetic field of the reading device 52. In the preferred embodiment of the present invention, the retuning means consists of an oscillating circuit, the coil of which (not shown in FIG. 1) is magnetically coupled to those of the transponders. The magnetic coupling of the coils of the transponders 50, the reading device 52 and the retuning means 56 is indicated by the symbol for a magnetic transmitter $\overline{M}$. In preferred embodiments of the present invention, the oscillating circuit of the retuning means 56 is detunable as is shown by an adjustable capacitor 58 in FIG. 1. Alternatively, the inductance of the coil of the retuning means 56, or both variables, could be changed.

An additional maximum is produced in the currents and/or voltages induced in the transponder coils of the transponders 50 by the retuning means. In addition, the maximums produced by each of the transponder coils are shifted with regard to their frequency positions. Selecting the frequency-dependent impedance of the retuning means 56 in a suitable manner can thereby cause one of the voltage or current maximums, respectively, induced in the transponder coils to be at the operating frequency $f_B$, so that all transponders of a transponder stack may be read out at the operating frequency $f_B$ stipulated by law.

Figure 2:
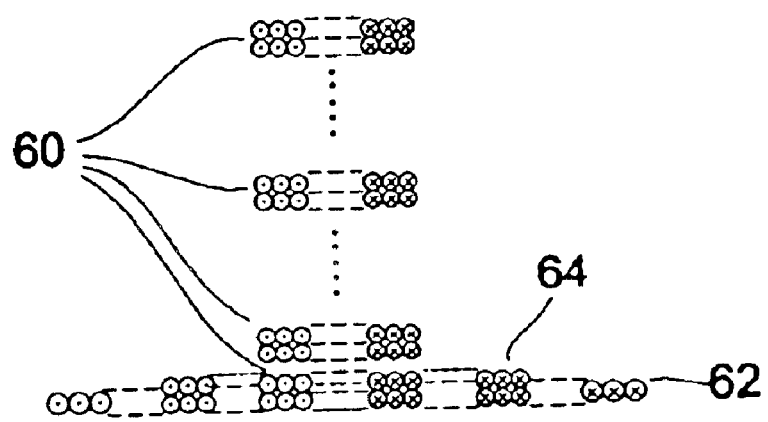
FIG. 2 shows a schematic representation of an embodiment of the present invention.

FIG. 2 shows a schematic representation of a possible arrangement of the coils towards each other in an inventive transponder reading device. FIG. 2 schematically shows the transponder coils 60 of four transponders arranged in a stack. In addition, FIG. 2 schematically shows a transmitter coil 62 of the reading device, and a coil 64 of the inventive retuning means. It shall be pointed out that FIG. 2 represents a schematic cross-sectional view of the respective coils. In the arrangement as shown in FIG. 2, the transponders of the transponder stack are arranged, with the transponder coils 60, in the alternating magnetic field of the transmitter coil 62 in such a manner that they are closely magnetically coupled to each other and that they are further closely magnetically coupled to the coil 64 of the retuning means.

The influence of the retuning means on the voltages or currents, respectively, induced in the transponder coils shall be set forth mathematically below. The voltages induced are proportional to the currents induced. In the consideration below, the currents are considered instead of the voltages, the electrical network, as is shown, for example, in FIG. 1, which contains the coupled coils of the transponders, of the reading device and of the retuning means, being examined using mesh current analysis. The meshes are the transponder oscillating circuits and the electric circuit of the transmitter coil. The vector of the source voltages shall be referred to as $\vec{u}_0$. There is only one source voltage in the electric circuit of the transmitter coil. The vector of the currents flowing through the coils shall be referred to as $\vec{i}$. The following is true:

$$\vec{u}_0 = \overline{Z}_M \vec{i} \tag{1}$$

In equation (1), $\overline{Z}_M$ represents the mesh impedance matrix of the transponder oscillating circuits. On the main diagonal, it contains the complex impedances of the transponder oscillating circuits, and on the secondary diagonals it contains terms caused by the mutual inductances. The currents thus are calculated as follows:

$$\vec{i} = \overline{Z}_M^{-1} \vec{u}_0 \tag{2}$$

In addition, the following applies:

$$\overline{Z}_M^{-1} = \frac{\overline{A}}{\det \overline{Z}_M} \tag{3}$$

The matrix $\overline{A}$ is the matrix of the cofactors of $\overline{Z}_M$.

It shall be assumed that the transponders are arranged in a stack and that their number is N. Depending on the frequency, the currents in the N transponder coils take on N maximums even if the resonant circuits of all transponders are set to the same resonant frequency. The reason for this is the mutual influence of the transponders due to the close magnetic coupling of same. The solution to the equation $$\det = \overline{Z}_M = 0 \tag{4}$$

determines where these N maximums lie. They spread across a frequency band in whose second third lies the resonant frequency $f_R$ to which the individual transponders are tuned. The lower limit of the band, i.e. the lowest frequency at which a current maximum occurs in a given arrangement, shall be referred to as $f_u$. If $f = f_u$, the current induced takes on the absolute maximum. The amplitudes of the maximums drop as the frequency rises. If N is increased, the frequency $f_u$ drops but still approaches a lower limit $f_{u,min}$.

As has already been set forth, the maximums of the current induced do not coincide with the operating frequency $f_B$ due to the preset transponder parameters as well as due to the set operating frequency $f_B$. To enable powering of the transponders, however, the amplitudes of the currents induced must take on a local maximum at the frequency of the transmitting voltage $f_B$. It is exclusively the solutions to equation (3), and thus $\overline{Z}_M$, that determine the frequency at which these currents take on a maximum. The position of the transponders in the stack has no influence here as long as there is close magnetic coupling of same. Once the developer has specified the geometry of the coils, the number of turns, the distances between the transponder coils, the resonant frequency and the quality of the transponder oscillating circuits, $\overline{Z}_M$ now only depends on N, i.e. on the number of transponders, or transponder coils. The inventors have therefore recognized that a system which can power all transponders, which are arranged in any number N desired in a stack, at a frequency, i.e. the operating frequency $f_B$, must have a variable influencing $\overline{Z}_M$, this variable being independent of N. This influence variable may then be changed, depending on N, such that one of the maximums to be found by solving equation (3) is $f_B$ in each case.

$\overline{Z}_M$ is obtained by means of mesh current analysis. The resonant circuits consisting of the transponder coils and the capacitors and resistors connected therewith, and the switching circuit consisting of the transmitter coil and the voltage source may be specified as the meshes. If $\overline{Z}_M$ is to be altered, additional meshes must be added to the network. Such additional meshes are added by the inventive introduction of a retuning means into the alternating magnetic field in close magnetic coupling to the transponder coils. That way, for each additional mesh, one row is added at the bottom and one column is added on the right-hand side in the matrix $\overline{Z}_M$.

Thus, equation (1) has other solutions. The amplitudes of the currents induced in the transponder coils thus take on maximums at other frequencies. By adjusting the frequency-dependent impedance of the retuning means in a suitable manner, one of the maximums can thus be set to the operating frequency $f_B$.

In the inventive introduction of the retuning means it becomes clear that an additional maximum of the amplitude of the currents induced is produced, which can be demonstrated using a computer simulation. It shall be pointed out at this point that the current maxima produced each occur in all transponder coils, which becomes readily obvious from looking at equations 1 to 4. In addition to producing the additional maximum, the introduction of the retuning means also leads to a shift of the current maximums produced by the individual transponder resonant circuits themselves. For a small number of transponders in the stack N, the maximum produced by the retuning means is more pronounced at frequencies of $f<f_u$ than at frequencies of $f>f_u$. Thus, the transponders are preferably tuned such that, with a small number of transponders in the stack N, $f_u>f_B$. With a small number of transponders, the impedance of the retuning means is preferably set such that the frequency at which the additional current maximum occurs coincides with the operating frequency $f_B$.

Alternatively, the transponders could be tuned to a different resonant frequency. For example, for a small number of transponders, $f_u \approx f_B$ could apply. As soon as N grows, $f_u$ becomes $<f_B$. It is highly unlikely that now one of the maximums produced by the transponders is at the operating frequency $f_B$. The retuning means would have to be used for producing a maximum of the frequency f with $f=f_B>f_u$. The question of whether or not such a procedure is expedient may be answered by means of the magnitude of the maximum brought about by the retuning means.

If $f_u>f_B$ applies, the retuning means produces a maximum at a frequency with $f=f_B$, i.e. with $f<f_u$. For $f_u<f_B$, they produce a maximum of the frequency $f=f_B>f_u$. As can be demonstrated in computer simulations, for example, the maximum for $f<f_u$ is much more pronounced than for $f>f_u$. For $f<f_u$, smaller field strengths of the transmitter coil are thus required to induce sufficient currents in the transponder coils. It is therefore expedient to tune the transponders such that $f_u>f_B$ applies. In this case, benefit can further be drawn from the fact that $f_u$ converges towards a lower limit $f_{u,min}$, so that, if $f_{u,min}=f_B$, the transponders are automatically tuned correctly as soon as their number is large enough.

With a large number of transponders in the stack, the additional maximum is less pronounced, so that it may be preferred, with a large number of transponders in the transponder stack, that a shift of a current maximum to the operating frequency $f_B$, the shift being caused by one of the transponder resonant circuits, is caused by the retuning means.

As has already been noted above, without the tuning means, the frequency $f_u$, at which the first current maximum occurs, approaches a lower limit $f_{u,min}$. If the number of transponders present in the transponder stack is large enough for the first current maximum to occur at the minimum cut-off frequency $f_{u,min}$, so that even the introduction of further transponders into the transponder stack does not lead to a further drop in the frequency at which this maximum occurs, it is possible to read out all transponders without using a tuning means by tuning the transponders, i.e. the resonant circuits of same, such that $f_{u,min}=f_B$. If there is at least such a number of transponders present in the field of the transmitter coil that the lower cut-off frequency $f_{u,min}$ is reached, the amplitude of the current induced in the coils has a maximum at $f_B$, so that the transponders may be powered and thus read out.

What is understood by a large or small number of transponders results from the minimum operating voltage of the transponder ASICs, the quality of the transponder oscillating circuits, and the strength of the magnetic field of the transmitter coil, as shall be explained below.

In the range around the frequency of the absolute maximum $f_u$, a frequency band may be defined so that the transponders may operate as soon as $f_B$ is within this band. The voltage induced is larger there than any voltage preset by the operating voltage of the ASICs. The band becomes broader if the ratio of the voltage induced in the transponder coils to the minimum operating voltage of the ASICs increases. The voltage induced is proportional to the magnetic field strength of the field of the transmitter coil, so that the width of the band increases as the field strength increases. There are two ways in which the quality influences the width of the band. An increasing quality causes the voltage induced to increase. At the same time, however, the so-called 3 dB bandwidth associated with the maximum becomes smaller. Along with same, the bandwidth of the band in which the operating frequency $f_B$ must lie for the transponder to be powered decreases. Therefore, optimum quality is the consequence of a compromise.

Like $f_u$, the frequency band shifts towards smaller frequencies as the number N of transponders increases. The number of transponders is considered large if the operating frequency $f_B$ is within the frequency band around $f_u$, so that the transponders may be operated without any retuning means. This approach is based on the precondition that the transponders are tuned such that the lower limit $f_{u,min}$ of the frequency of the first maximum fu equals the operating frequency $f_B$.

As has been explained above, in accordance with the invention, an oscillating circuit with an adjustable resonant frequency, by changing the frequency-dependent impedance of same, is preferably used as the retuning means. By changing the capacitance of the capacitor and/or the inductance of the coil in the retuning means, provisions can thus be made for a maximum of the amplitudes of the currents to form in the transponder stack at $f=f_B$. In order to enable a reading out of all coils with an unknown number of transponder coils, cycles for varying the inductance and/or the capacitance of the retuning means may be passed, for example, until all transponders respond. The fact that all transponders respond may readily be detected in the reading device by observing the power drawn from the alternating magnetic field. If all transponders respond simultaneously, time division multiplex protocols may be used to evaluate the responses of the individual transponders, for example by associating a time slot with each transponder.

If there is a fixed number of transponders in the transponder stack, and if all other parameters are constant, such as, for example, coil geometries, numbers of turns, and distances between the transponder coils, resonant frequency and the quality of the transponder oscillating circuits, etc., it is sufficient to once determine the frequency-dependent impedance of the retuning means required to enable a readout of transponders with this fixed number of same.

The quality of the transponder resonant circuits and the field strength of the magnetic field of the transmitter coil are preferably selected in view of the statutory provision and the current consumption as well as the minimum operating voltages of the transponders, such that the transponders are as insensitive as possible to mistuning. However, the broader the resonance spectrum of the transponder oscillating circuit becomes in order to provide insensitivity to mistuning, the more transmitting power is required. However, since the transmitting power must remain within the statutory norms, the resonance spectra of the transponder oscillating circuits must be kept accordingly narrow.

The coil of the retuning means is preferably dimensioned such that it is coupled to the transponder coils in such a manner that scattering is minimal. In the ideal case, which cannot be achieved, the capacitance is to map itself directly at the terminals of the transponder coils via the turns ratio, as with a scatter-free transformer. Then the transponders would be mistuned towards a smaller resonant frequency, and the frequency band in which the maximums occur would immediately shift towards smaller frequencies, so that with a limited number of transponders present in the field of the transmitter coil, the frequency at which the absolute maximum occurs, i.e. the above-described frequency $f_u$, may be shifted towards the operating frequency $f_B$.

In summary, it can be stated that it is not possible to simultaneously read out a plurality of transponders until a retuning device in accordance with the present invention has been introduced. In this context it shall be pointed out that the retuning means need not necessarily be constituted by an oscillating circuit to this end. Each element having a frequency-dependent impedance may rather serve as the retuning means, this frequency-dependent impedance preferably being variable to enable, as has been described above, an unknown number of transponders to be read out by varying the frequency-dependent impedance accordingly until all transponders respond. Here, the frequency-dependent impedance may simply be formed by a short-circuited coil or by a coil connected to further network elements, for example capacitors, resistors, or coils. Here, the properties of the coils and/or of the network elements may be varied depending on the number and nature of the transponder coils stacked to enable an unknown number of transponders to be read out.

Needless to say, several coils and/or several oscillating circuits may be introduced as the retuning means into the alternating magnetic field of the transmitter coil and thus into a magnetic coupling to the transponder coils. In addition, several retuning means with differing frequency-dependent impedances may be introduced one by one into the field of the transmitter coil as retuning devices, the differing frequency-dependent impedances being stipulated for differing numbers of transponders, respectively, so that, if a corresponding number of transponders are present in the stack, reading out may be effected by means of the retuning means associated.

What is claimed is:

1. Transponder reading device for reading out a plurality of inductive passive transponders having a resonant circuit, the device comprising:
   a transmitter coil for generating an alternating magnetic field having an operating frequency $f_B$, in which the plurality of transponders may be placed such that they are magnetically coupled to each other; and
   a retuning circuit arranged in the alternating magnetic field and having such a frequency-dependent impedance that a voltage induced in the resonant circuits of the transponders by the alternating magnetic field has a maximum in the range of the operating frequency $f_B$.

2. Transponder reading device as claimed in claim 1, wherein the retuning circuit comprises a coil.

3. Transponder reading device as claimed in claim 2, wherein the retuning circuit further comprises at least one further network element which is connected to the coil and is selected from the group consisting of capacitors, resistors, and coils.

4. Transponder reading device as claimed in claim 1, wherein the retuning circuit comprises a resonant circuit.

5. Transponder reading device as claimed in claim 1, wherein the frequency-dependent impedance of the retuning circuit is variable.

6. Transponder reading device as claimed in claim 5, wherein the resonant circuit of the retuning circuit comprises a coil and a capacitor, the inductance of the coil and/or the capacitance of the capacitor of the resonant circuit of the retuning circuit being variable.

7. Transponder reading device as claimed in claim 5, which further comprises a controller for varying the impedance of the retuning circuit until a voltage induced in the resonant circuits of the transponders by the alternating magnetic field has a maximum in the range of the operating frequency $f_B$.

8. Method for reading out a plurality of inductive passive transponders having a resonant circuit, the method comprising:
   generating an alternating magnetic field having an operating frequency $f_B$;
   placing the plurality of transponders in the alternating magnetic field such that the transponders are magnetically coupled to each other;
   placing a retuning circuit in the alternating magnetic field, the retuning circuit having such a frequency-dependent impedance that a voltage induced in the resonant circuits of the transponders by the alternating magnetic field has a maximum in the range of the operating frequency $f_B$; and
   receiving data created by the transponders in response to the voltage induced.

9. Method as claimed in claim 8, wherein the step of placing the retuning circuit includes the step of varying the impedance of the retuning circuit until the voltage induced in the resonant circuits of the transponders by the alternating magnetic field has a maximum in the range of the operating frequency $f_B$.

10. Transponder having a resonant circuit consisting of a transponder coil and a tuning capacitor, the resonant circuit being tuned such that a lower minimum cut-off frequency $f_{u,min}$ is in the range of a preset operating frequency $f_B$ of an alternating magnetic field, the lower minimum cut-off frequency $f_{u,min}$ being the frequency approached by the lowest-frequency maximum of the voltage induced in the transponder resonant circuit by the alternating magnetic field of the operating frequency $f_B$ if a theoretically unlimited number of transponders are arranged in the alternating magnetic field.

* * * * *